United States Patent
Niimi et al.

(10) Patent No.: US 11,052,842 B2
(45) Date of Patent: Jul. 6, 2021

(54) VEHICLE CONTROL DEVICE

(71) Applicant: TOYOTA JIDOSHA KABUSHIKI KAISHA, Toyota (JP)

(72) Inventors: Yoshitaka Niimi, Susono (JP); Naoyoshi Takamatsu, Sunto-gun (JP); Shunya Kobayashi, Gotemba (JP); Satoru Ito, Numazu (JP); Takuya Sakamoto, Susono (JP); Hirotsugu Ohata, Susono (JP); Shigeaki Goto, Nagakute (JP); Shuji Tomura, Nagakute (JP); Naoki Yanagizawa, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 20 days.

(21) Appl. No.: 16/701,333

(22) Filed: Dec. 3, 2019

(65) Prior Publication Data

US 2020/0198563 A1 Jun. 25, 2020

(30) Foreign Application Priority Data

Dec. 25, 2018 (JP) .............................. JP2018-240938

(51) Int. Cl.
*B60R 16/03* (2006.01)
*B60L 58/19* (2019.01)
*H02J 7/00* (2006.01)
*H02J 7/14* (2006.01)

(52) U.S. Cl.
CPC .............. *B60R 16/03* (2013.01); *B60L 58/19* (2019.02); *H02J 7/0024* (2013.01); *H02J 7/1415* (2013.01); *Y02T 10/70* (2013.01); *Y02T 10/7072* (2013.01); *Y02T 90/14* (2013.01)

(58) Field of Classification Search
CPC ..... B60R 16/03; Y02T 90/14; Y02T 10/7072; Y02T 10/70; H02J 7/1423; H02J 7/1415; H02J 7/0024; B60L 58/19
USPC .......... 307/9.1, 10.1, 37, 63, 71; 318/95, 83, 318/93, 497; 323/271, 246; 320/117, 320/118, 126
See application file for complete search history.

(56) References Cited

U.S. PATENT DOCUMENTS

| | | |
|---|---|---|
| 8,866,430 B2 | 10/2014 | Takamatsu et al. |
| 8,994,212 B2 | 3/2015 | Kurokawa et al. |
| 9,725,007 B2 | 8/2017 | Hashimoto |

(Continued)

FOREIGN PATENT DOCUMENTS

| | | |
|---|---|---|
| JP | 2014-003858 A | 1/2014 |
| JP | 2016-005297 A | 1/2016 |
| WO | 2012/144019 A1 | 10/2012 |

*Primary Examiner* — Toan T Vu
(74) *Attorney, Agent, or Firm* — Oliff PLC (57) ABSTRACT

A vehicle control device includes: first and second power supplies, and a control unit controlling to, when a remaining capacity difference between the first power supply and the second power supply is large, to reduce a first operating range, in which the connection state with the electrical load is controlled to be series connection state of the power supplies, and increase a second operating range, in which the connection state with the electrical load is controlled to be the parallel connection state of the power supplies or the single connection state of one of the power supplies having a larger remaining capacity, as compared with a case where the remaining capacity difference is small.

6 Claims, 8 Drawing Sheets

(56) References Cited

U.S. PATENT DOCUMENTS

2008/0054870 A1* 3/2008 Kosaka ................ B60L 58/21
                                                    323/293
2013/0342151 A1* 12/2013 Kurokawa ............ H02M 3/158
                                                    318/500

* cited by examiner

VEHICLE CONTROL DEVICE

CROSS-REFERENCE TO RELATED APPLICATION(S)

The present application claims priority to and incorporates by reference the entire contents of Japanese Patent Application No. 2018-240938 filed in Japan on Dec. 25, 2018.

BACKGROUND

The present disclosure relates to a vehicle control device.

Japanese Laid-open Patent Publication No. 2014-3858 discloses a power supply device that includes two power supplies, at least one reactor element, and a switch circuit, and that adjusts output voltage relative to the load by alternately switching a connection state of the two power supplies between a parallel connection state and a series connection state. WO 2012/144019 A discloses a control device that controls, based on a motor rotational speed and a target output torque, a boost converter so as to output an inverter input voltage that minimizes motor system loss.

By applying the control device disclosed in WO 2012/144019 A to the power supply device disclosed in Japanese Laid-open Patent Publication No. 2014-3858, a connection state of the two power supplies can be controlled at operating points other than the operating point at which the connection state of the two power supplies is only to be a series connection state, by determining whether a connection state in which the motor can be efficiently operated based on the motor rotational speed and the target output torque is any of a parallel connection state, a series connection state, or a single driving state of one power supply. Note that, the operating point at which the connection state of the two power supplies is only to be the series connection state includes, for example, a case where the single power of the two power supplies is less than the required power, and the single power of the two power supplies is less than the counter-electromotive power of the motor.

SUMMARY

There is a need for providing a vehicle control device capable of preventing an occurrence of output limit due to imbalance of remaining capacity between two power sources.

According to an embodiment, a vehicle control device includes: a first switch element connected between a positive line and a first node; a second switch element connected between the first node and a second node; a third switch element connected between the second node and a negative line; a first power supply having a positive electrode and a negative electrode, which are connected to the first node and the negative line, respectively; a reactor element connected between the positive line and a third node; and a second power supply having a positive electrode and a negative electrode, which are connected to the third node and the second node, respectively. Further, the vehicle control device switches, by switching on/off states of the first switch element, the second switch element, and the third switch element, a connection state of the first power supply, the second power supply, and an electrical load between a series connection state, in which the first power supply and the second power supply, which are connected in series, are connected to the electrical load, a parallel connection state, in which the first power supply and the second power supply, which are connected in parallel, are connected to the electrical load, and a single connection state in which only one of the first power supply and the second power supply is connected to the electrical load, and the vehicle control device further includes a control unit reducing, when a remaining capacity difference between the first power supply and the second power supply is large, a first operating range, in which the connection state with the electrical load is controlled to be the series connection state, and increasing a second operating range, in which the connection state with the electrical load is controlled to be the parallel connection state or the single connection state of one of the power supplies having a larger remaining capacity, as compared with a case where the remaining capacity difference is small.

DETAILED DESCRIPTION OF THE PREFERRED EMBODIMENT

In the related-art control, when the connection state of the two power supplies is changed from the state in which the remaining capacities of the two power supplies are unbalanced (the single driving state by one power supply) to the series connection state, and when the series connection state is continued due to steady traveling or the like, the remaining capacities of the two power supplies are to be decreased while being unbalanced. As a result, the remaining capacity of one power supply reaches the lower limit value ahead of the other, and the series connection state cannot be maintained. Then, the output may be restricted due to the single driving state of the other power supply.

Hereinafter, a configuration of a vehicle control device according to an embodiment of the present disclosure is described with reference to the accompanying drawings.

Configuration of Vehicle

First, a configuration of a vehicle to which a vehicle control device according to an embodiment of the present disclosure is applied is described with reference to FIG. 1.

Figure 1:
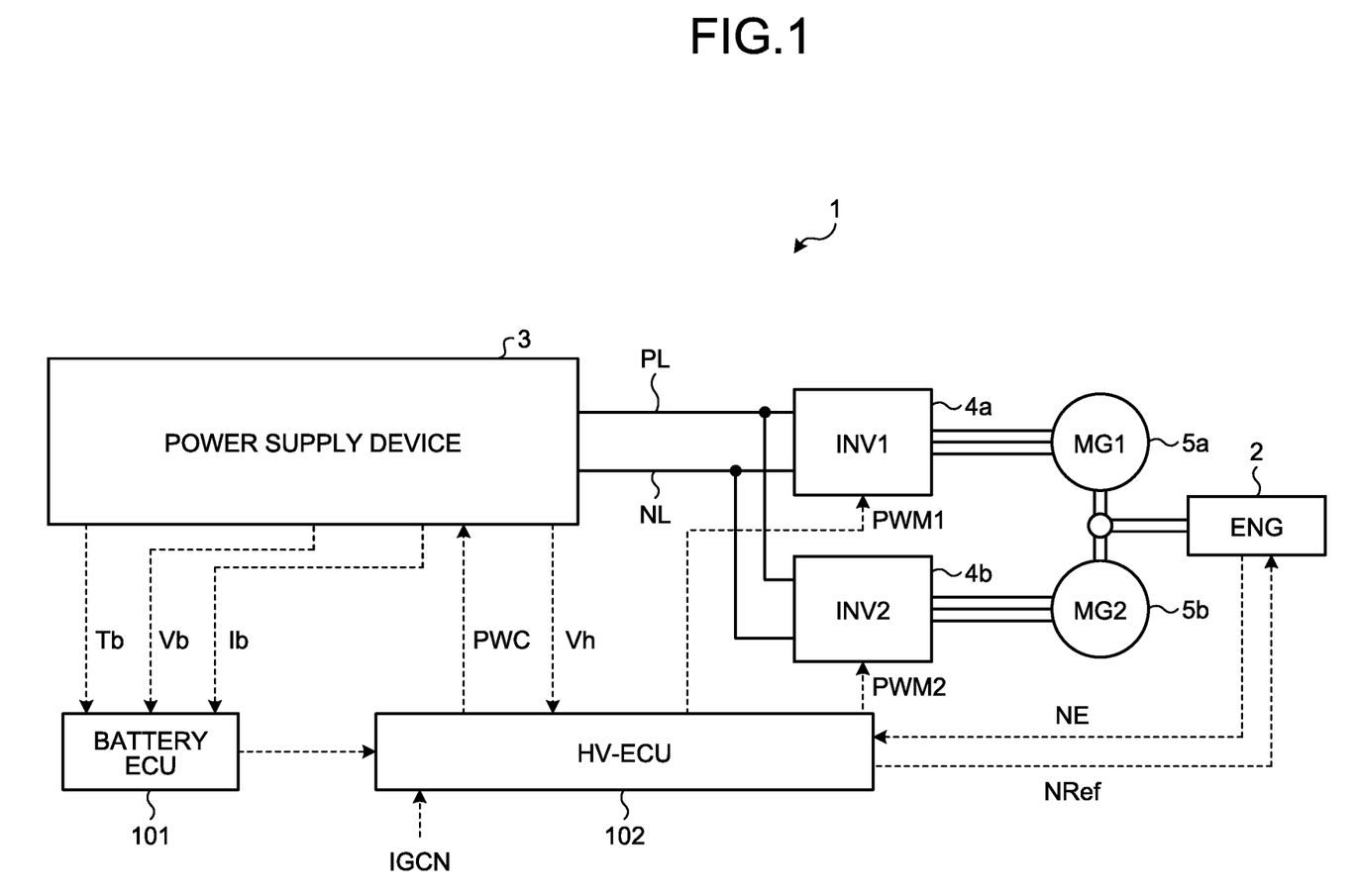
FIG. 1 is a block diagram illustrating a configuration of a vehicle to which a vehicle control device according to an embodiment of the present disclosure is applied.

FIG. 1 is a block diagram illustrating a configuration of a vehicle to which a vehicle control device according to an embodiment of the present disclosure is applied. As illustrated in FIG. 1, a vehicle 1 to which a vehicle control device according to an embodiment of the present disclosure is applied is a Hybrid Vehicle (HV), and includes an engine (ENG) 2, a power supply device 3, a first inverter (INV1) 4a, a second inverter (INV2) 4b, a first motor (MG1) 5a, and a second motor (MG2) 5b. The vehicle 1 is not limited to an HV vehicle, and may be an Electric Vehicle (EV), a Plug-in Hybrid Vehicle (PHV), a Fuel Cell Electric Vehicle (FCEV) or the like.

The engine 2 is an internal combustion engine that outputs power using gasoline, light oil or the like as a fuel, and is drive-controlled by an HV electronic control unit (hereinafter, referred to as an HV-ECU) 102 to be described later.

The power supply device 3 is connected to the first inverter 4a and the second inverter 4b via a positive line PL and a negative line NL, and is controlled by a battery electronic control unit (hereinafter, referred to as a battery ECU) 101 to be described later.

The first inverter 4a and the second inverter 4b each include a plurality of switch elements, and each have a function for mutually converting direct current (DC) power and alternating current (AC) power. By the HV-ECU 102 controlling on/off of the switch elements, the first inverter 4a and the second inverter 4b convert DC power supplied from the power supply device 3 into AC power to supply the converted power to the first motor 5a and the second motor 5b, and convert AC power generated by the first motor 5a and the second motor 5b into DC power to supply the converted power to the power supply device 3.

The first motor 5a and the second motor 5b are synchronous generator motors. The first motor 5a and the second motor 5b function as a motor for driving the vehicle by being driven by the AC power supplied from the first inverter 4a and the second inverter 4b, respectively, and function as a generator that generates AC power using the driving force of the vehicle 1.

The vehicle 1 includes the battery ECU 101 and the HV-ECU 102 as a control system.

The battery ECU 101 manages charging states of a plurality of batteries constituting the power supply device 3, detects abnormalities, and controls the voltage. The battery ECU 101 receives various electric signals, such as an electric signal indicating a temperature Tb of each battery, an electric signal indicating an output voltage Vb of each battery, and an electric signal indicating an output current Ib of each battery. The battery ECU 101 calculates the remaining capacity of each battery based on the temperature Tb, the output voltage Vb, the current Ib and the like. The battery ECU 101 transmits various signals, such as the output voltage Vb, the temperature Tb, and the remaining capacity of each battery, to the HV-ECU 102. The battery ECU 101 further outputs a control signal to the power supply device 3 based on a command signal received from the HV-ECU 102.

The HV-ECU 102 is capable of mutually communicating with the battery ECU 101, and transmits and receives various signals, such as various commands and detection results of various sensors. The HV-ECU 102 controls the engine 2, the first inverter 4a, the second inverter 4b, and the output voltage of the power supply device 3 in order to generate a vehicle driving force according to the driver's request when the vehicle 1 travels. The HV-ECU 102 receives various signals, such as an operation signal IGCN of an ignition switch, a rotational speed NE of the engine 2, a rotational speed of each of the first motor 5a and the second motor 5b, a vehicle speed, an accelerator opening degree, an output voltage Vh of the power supply device 3, a temperature Tb, and a remaining capacity of each battery. The HV-ECU 102 further outputs signals calculated based on the input information, such as a control signal NRef for the engine 2, signals PWM1 and PWM2, which are Pulse Width Modulation (PWM) control signals, for the first inverter 4a and the second inverter 4b, a command signal for switching the output voltage of the power supply device 3 to a requested voltage, and a signal PWC, which is a PWM control signal for the switch elements in the power supply device 3.

The battery ECU 101 and the HV-ECU 102 are physically an electronic circuit including, as a main body, a known microcomputer including a central processing unit (CPU), a random access memory (RAM), a read only memory (ROM), and an input/output interface. The functions of the battery ECU 101 and the HV-ECU 102 are performed by the CPU loading computer programs held in the ROM into the RAM and executing them to operate the control target, and reading and writing data from/in the RAM and the ROM.

Configuration of Power Supply Device

Next, a configuration of the power supply device 3 is described with reference to FIGS. 2 and 3.

Figure 2:
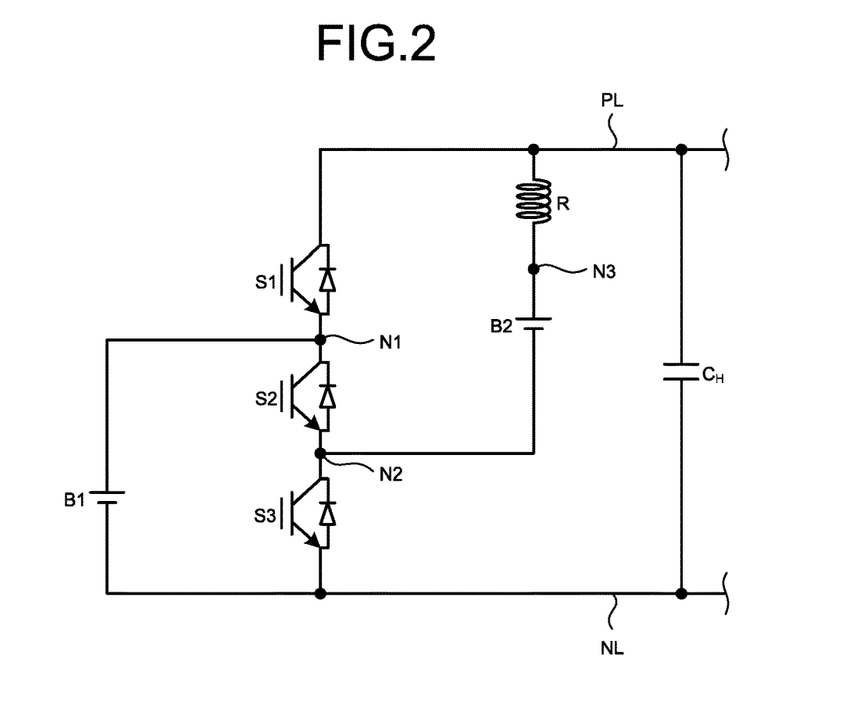
FIG. 2 is a circuit diagram illustrating a configuration of a power supply device of FIG. 1.

FIG. 2 is a circuit diagram illustrating a configuration of the power supply device 3 of FIG. 1. As illustrated in FIG. 2, the power supply device 3 includes a first switch element S1 connected between a positive line PL and a first node N1, a second switch element S2 connected between the first node N1 and a second node N2, a third switch element S3 connected between the second node N2 and a negative line NL, and a first battery B1 having the positive and negative electrodes respectively connected to the first node N1 and the negative line NL, a reactor element R connected between the positive line PL and a third node N3, a second battery B2 having the positive and negative electrodes respectively connected to the third node N3 and the second node N2, and a smoothing capacitor $C_H$ connected between the positive line PL and the negative line NL. Here, the first battery B1 and the second battery B2 may be capacitors.

The first switch element S1, the second switch element S2, and the third switch element S3 are semiconductor switching elements. As the semiconductor switching element, an Insulated Gate Bipolar Transistor (IGBT) is used. Between the collector terminal and the emitter terminal of the IGBT, a diode (rectifying element) having the anode connected to the emitter terminal is connected. If a semiconductor switching element other than an IGBT is used, a diode is connected in parallel to the semiconductor switching element so that the current flows in an opposite direction to the current flowing when the switch element is turned on. The diode may be a parasitic diode accompanying the semiconductor switching element. In this specification, a combination of a semiconductor switching element and a diode is referred to a switch element.

Connection State with Electrical Load

In the power supply device 3, the HV-ECU 102 controls the on/off states of the first switch element S1, the second switch element S2, and the third switch element S3 to switch a connection state of the first battery B1 and the second battery B2 with the first inverter 4a and the second inverter 4b (electrical load) between a series connection state, a parallel connection state, a single connection state of the first battery B1, and a single connection state of the second battery B2.

Specifically, the HV-ECU 102 controls the first switch element S1 and the third switch element S3 to be OFF, and the second switch element S2 to be ON in order to connect the first battery B1 and the second battery B2 connected in series to the first inverter 4a and the second inverter 4b (the serial connection state). Alternatively, the HV-ECU 102 controls the first switch element S1 and the third switch element S3 to be ON, and the second switch element S2 to be OFF in order to connect the first battery B1 and the second battery B2 connected in parallel to the first inverter 4a and the second inverter 4b (the parallel connection state). Alternatively, the HV-ECU 102 controls the first switch element S1 to be ON, and the second switch element S2 and the third switch element S3 to be OFF in order to connect only the first battery B1 to the first inverter 4a and the second inverter 4b (the single connection state of the first battery B1). Alternatively, the HV-ECU 102 controls the first switch element S1 and the second switch element S2 to be OFF, and the third switch element S3 to be ON in order to connect only the second battery B2 to the first inverter 4a and the second inverter 4b (the single connection state of the second battery B2).

Switching of Connection with Electrical Load

In the power supply device 3, the HV-ECU 102 further switches, based on the rotational speed (hereinafter, referred to as the motor rotational speed) and the output torque (hereinafter, referred to as the motor torque) of the first motor 5a and the second motor 5b (hereinafter, referred to as a motor), the connection state of the first battery B1, the second battery B2, the first inverter 4a, and the second inverter 4b. Note that, the first motor 5a and the second motor 5b are hereinafter collectively referred to as the motor, and the first inverter 4a and the second inverter 4b are hereinafter collectively referred to as the inverter. The relationship between the motor rotational speed, the motor torque, and the connection state of the first battery B1, the second battery B2, and the inverter is described with reference to FIGS. 3 and 4.

Figure 3:
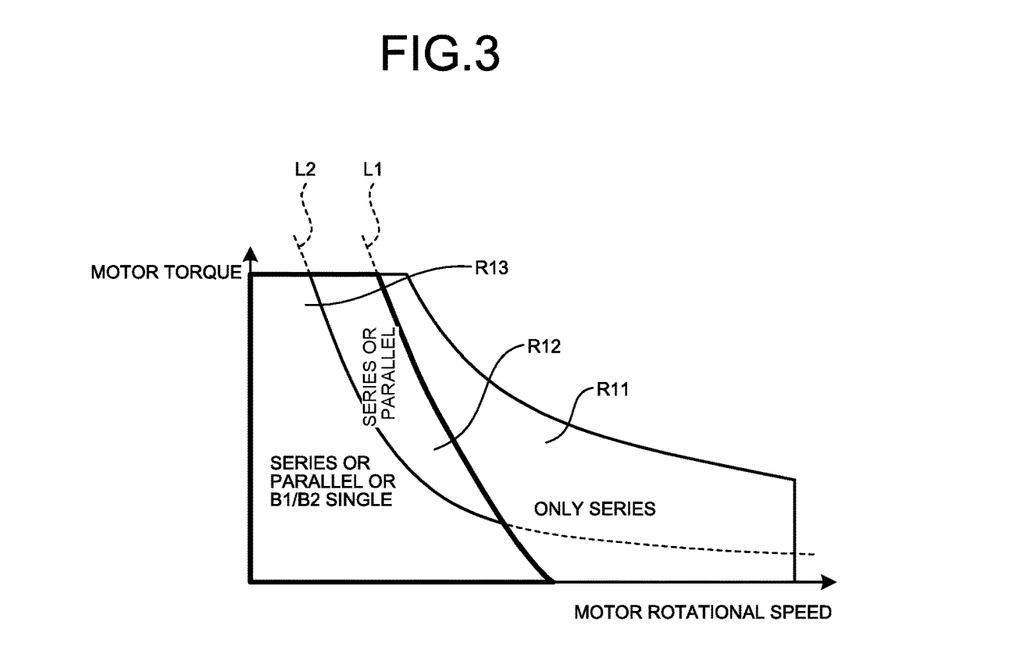
FIG. 3 is a diagram illustrating an example of a relationship between the motor rotational speed, the motor torque, and a connection state of a first battery and a second battery.
Figure 4:
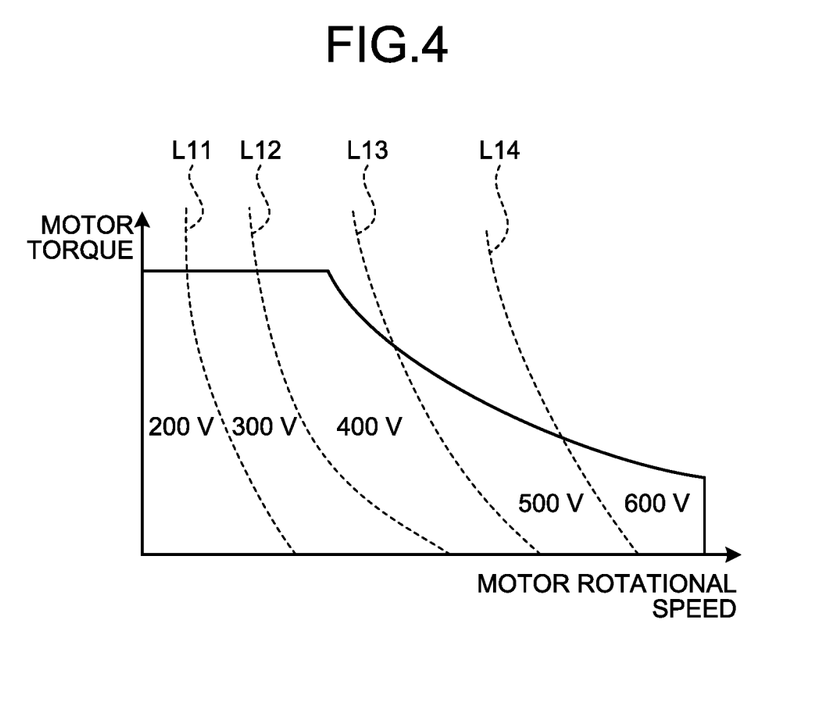
FIG. 4 is a diagram illustrating an example of curves representing required minimum voltages of a motor.

FIG. 3 is a diagram illustrating an example of a relationship between the motor rotational speed, the motor torque, and the connection state of the first battery B1, the second battery B2, and the inverter. FIG. 4 is a diagram illustrating an example of curves representing required minimum voltages of the motor. In FIG. 3, a curve L1 represents one of curves L11 to L14 representing the required minimum voltages of the motor determined from the motor rotational speed and the motor torque illustrated in FIG. 4. In a motor operating range R11 in which the output voltage of the first battery B1 or the output voltage of the second battery B2, whichever is larger, is smaller than the required minimum voltage represented by the curve L1, the connection state of the first battery B1, the second battery B2, and the inverter is switched to the series connection state (operating range R11) in order to supply the sum of the output voltages of the first battery B1 and the second battery B2 to the inverter. On the other hand, a curve L2 represents the power that can be output by the first battery B1 alone or the second battery B2 alone. In a motor operating range R12 enclosed by the curve L1 and the curve L2, the connection state of the first battery B1, the second battery B2, and the inverter is switched to the series connection state or the parallel connection state.

In a motor operating range R13 in which the motor rotational speed and motor torque are smaller than the motor rotational speed and the motor torque corresponding to the curve L2, the connection state of the first battery B1, the second battery B2, and the inverter is switched to any one of the series connection state, the parallel connection state, the single connection state of the first battery B1, and the single connection state of the second battery B2. In the motor operating ranges R12 and R13, the connection state of the first battery B1, the second battery B2, and the inverter is determined by calculating, with reference to the map data indicating the relationship between a motor operating point and the loss, the circuit loss of the power supply device 3, the inverter loss, and the motor loss at a motor operating point for each connection state, and selecting the connection state in which the lowest sum of the calculated losses, that is, the connection state for most efficiently operating the motor.

Figure 5:
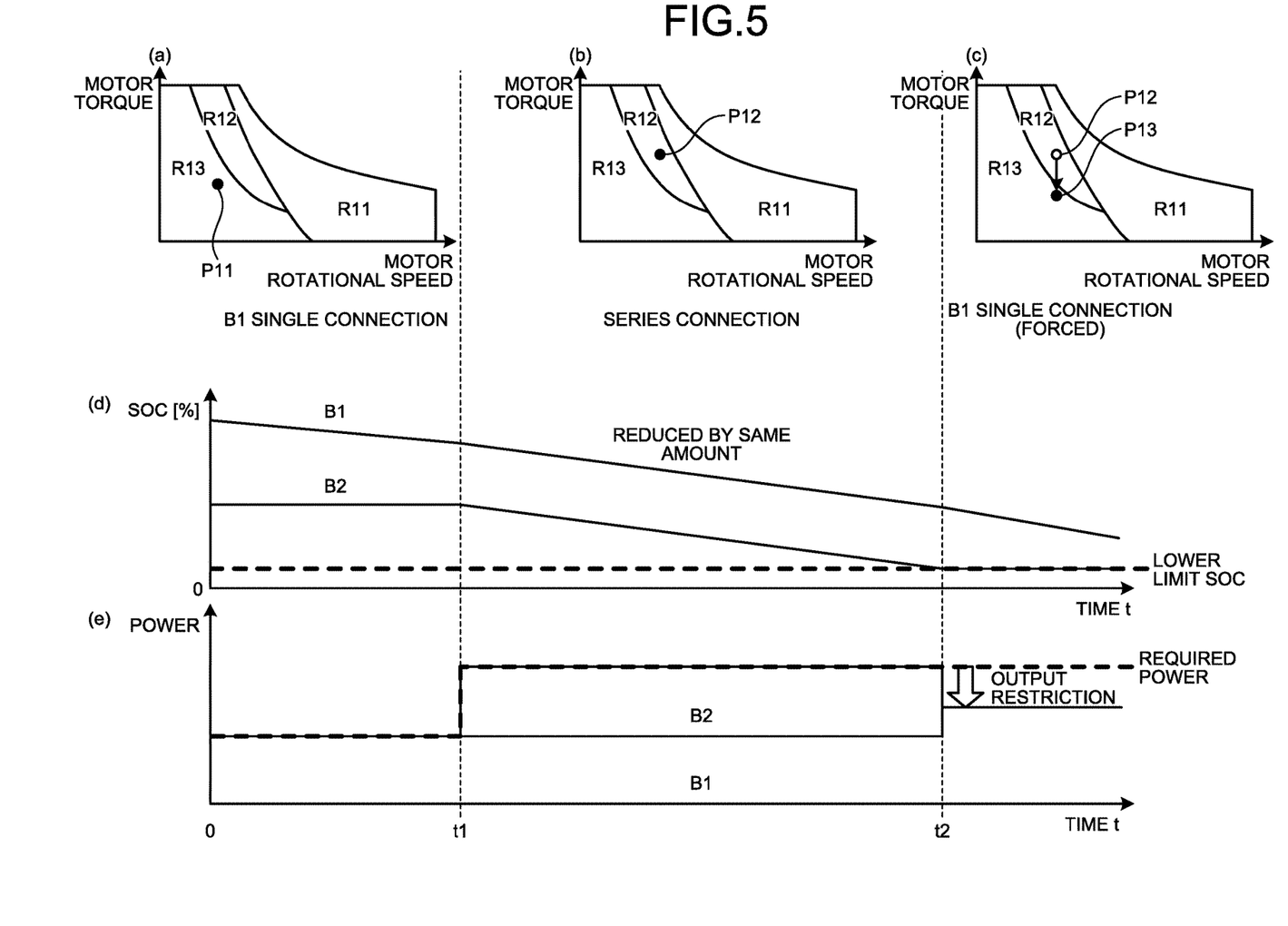
FIG. 5 is a diagram illustrating a problem in a related-art power supply device.

However, when the connection state for most efficiently operating the motor in the motor operating ranges R12 and R13 is selected as described above, a problem as illustrated in FIG. 5 occurs. FIG. 5 is a diagram illustrating a problem in a related-art power supply device. When the connection state for most efficiently operating the motor in the motor operating ranges R12 and R13 is selected, the state in which the remaining capacity (SOC, i.e., state of charge) of the first battery B1 and the remaining capacity of the second battery B2 are unbalanced as illustrated in FIG. 5, that is, the single connection state of the first battery B1 or the single connection state of the second battery B2 (a requested operating point P11) can be changed to the series connection state (a requested operating point P12) (time t illustrated in FIG. 5=t1).

At this time, when the series connection state is continued due to steady traveling of the vehicle 1 (time t illustrated in FIGS. 5=t1 to t2), the remaining capacity of the first battery B1 and the remaining capacity of the second battery B2 are reduced by the same amount while the remaining capacity of the first battery B1 and the remaining capacity of the second battery B2 are kept unbalanced. As a result, the remaining capacity of one of the two batteries (the second battery B2 in the example illustrated in FIG. 5) reaches the lower limit (SOC) first, and the series connection state cannot be maintained. Thus, the connection state becomes the single connection state (the required operating point P12 is moved to an operating point P13), and the required output can be restricted (time t illustrated in FIG. 5=t3).

For this reason, in the present embodiment, the HV-ECU 102 performs connection-state control processing described below in order to prevent the output from being restricted due to the imbalance between the remaining capacities of the first battery B1 and the second battery B2. The operation of the HV-ECU 102 when performing the connection-state control processing is described below with reference to FIGS. 6 to 8.

Connection-State Control Processing

Figure 6:
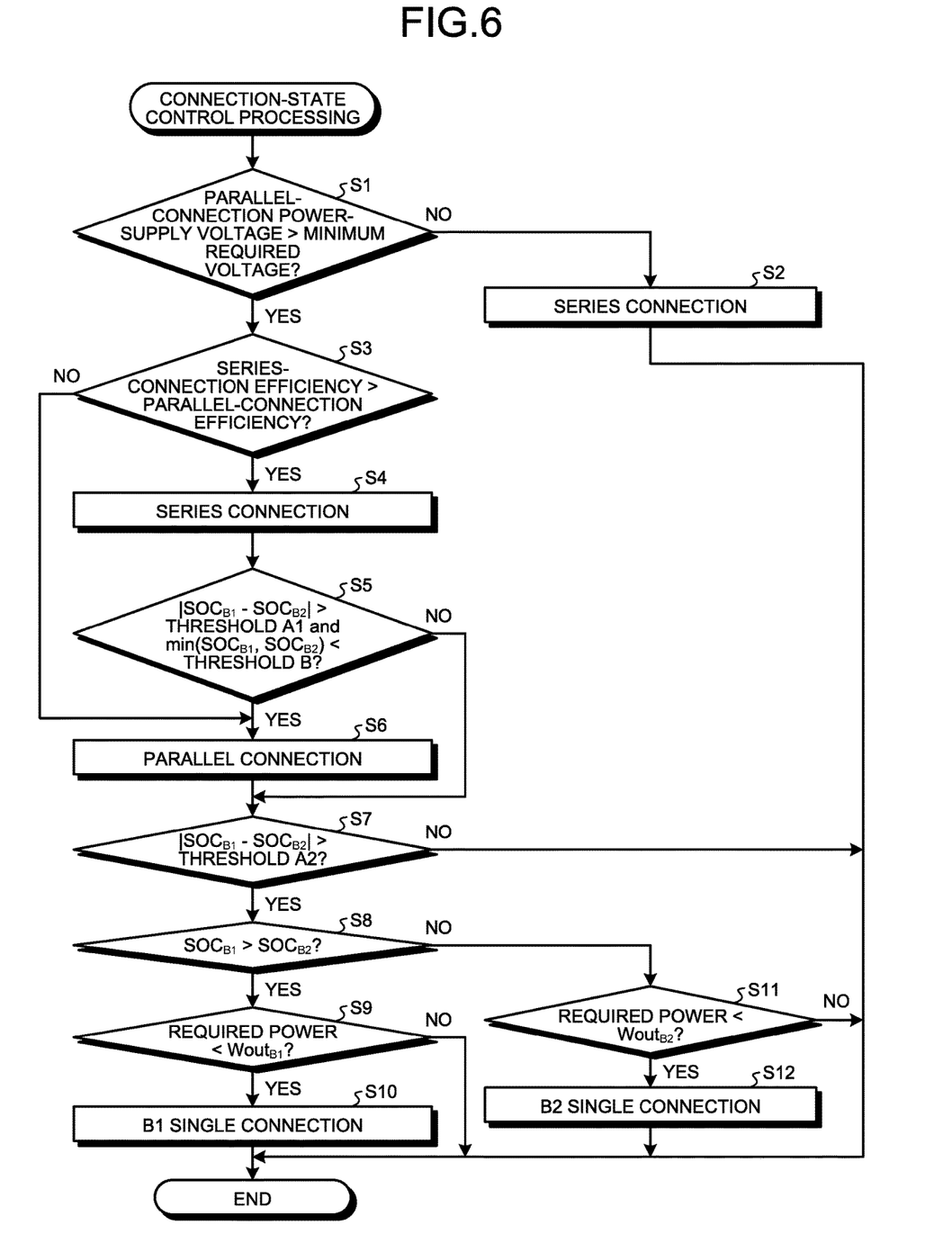
FIG. 6 is a flowchart illustrating a connection-state control processing according to an embodiment of the present disclosure.

FIG. 6 is a flowchart illustrating a connection-state control processing according to an embodiment of the present disclosure. The flowchart of FIG. 6 starts when the ignition switch of the vehicle 1 is switched from the off state to the on state, and the connection-state control processing proceeds to step S1. While the ignition switch of the vehicle 1 is in the on state, the connection-state control processing is performed again at a timing when a predetermined time elapses since the previous connection-state control processing has been terminated.

In step S1, the HV-ECU 102 determines whether the output voltage of the power supply device 3 when the connection state of the first battery B1, the second battery B2, and the inverter is in the parallel connection state (a parallel-connection power-supply voltage) is greater than the minimum required voltage of the motor. The parallel-connection power-supply voltage can be calculated from the output voltage of the first battery B1 and the output voltage of the second battery B2, and the minimum required voltage of the motor can be calculated from the motor rotational speed and the motor torque. In addition, the parallel-connection power-supply voltage may be the output voltage of the first battery B1 or the output voltage of the second battery B2, whichever is smaller. As the result of the determination, when the parallel-connection power-supply voltage is greater than the minimum required voltage of the motor (step S1: Yes), the HV-ECU 102 advances the connection-state control processing to step S3. On the other hand, when the parallel-connection power-supply voltage is equal to or less than the minimum required voltage of the motor (step S1: No), the HV-ECU 102 advances the connection-state control processing to step S2. The HV-ECU 102 may perform step S1 based on the magnitude relationship between the parallel-connection power-supply voltage and a predetermined voltage, which is equal to or less than the minimum required voltage of the motor.

In step S2, the HV-ECU 102 determines the connection state of the first battery B1, the second battery B2, and the inverter as the series connection state. The processing of step S2 is thereby completed, and the series of connection-state control processing is terminated.

In step S3, the HV-ECU 102 calculates, with reference to the map illustrating the relationship between the output voltages of first battery B1 and second battery B2 and the loss of the power supply device 3, the efficiency when the connection state of the first battery B1, the second battery B2, and the inverter is the series connection state (serial-connection efficiency), and the efficiency when the connection state of the first battery B1, the second battery B2, and the inverter is the parallel connection state (parallel-connection efficiency). Then, the HV-ECU 102 determines whether the serial-connection efficiency is greater than the parallel-connection efficiency. As the result of the determination, when the serial-connection efficiency is greater than the parallel-connection efficiency (step S3: Yes), the HV-ECU 102 advances the connection-state control processing to step S4. On the other hand, when the serial-connection efficiency is equal to or less than the parallel-connection efficiency (step S3: No), the HV-ECU 102 advances the connection-state control processing to step S6.

In step S4, the HV-ECU 102 determines the connection state of the first battery B1, the second battery B2, and the inverter as the series connection state. The processing of step S4 is thereby completed, and the connection-state control processing proceeds to step S5.

In step S5, the HV-ECU 102 calculates a remaining capacity $SOC_{B1}$ of the first battery B1 and a remaining capacity $SOC_{B2}$ of the second battery B2 to calculate a difference $|SOC_{B1}-SOC_{B2}|$ between the remaining capacity $SOC_{B1}$ and the remaining capacity $SOC_{B2}$. The HV-ECU 102 further identifies the remaining capacity $SOC_{B1}$ or the remaining capacity $SOC_{B2}$, whichever is smaller, as an index correlated with the remaining capacities of the first battery B1 and the second battery B2. Then, the HV-ECU 102 determines whether the difference $|SOC_{B1}-SOC_{B2}|$ is greater than a threshold A1, and whether the remaining capacity $SOC_{B1}$ or the remaining capacity $SOC_{B2}$, whichever is smaller, is less than a threshold B.

The HV-ECU 102 may change the threshold A1 and the threshold B depending on the required power of the motor, the motor rotation number, and the motor torque. In addition, in the present embodiment, the HV-ECU 102 uses the difference between the remaining capacity $SOC_{B1}$ and the remaining capacity $SOC_{B2}$, but may calculate and use other parameters correlated with a difference, such as a ratio of the remaining capacity $SOC_{B2}$ to the remaining capacity $SOC_{B1}$. Furthermore, the HV-ECU 102 may calculate and use, as an index correlated with the remaining capacities of the first battery B1 and the second battery B2, the average value of the remaining capacity $SOC_{B1}$ and the remaining capacity $SOC_{B2}$ instead of the remaining capacity $SOC_{B1}$ or the remaining capacity $SOC_{B2}$, whichever is smaller.

As the result of the determination, when the difference $|SOC_{B1}-SOC_{B2}|$ is greater than the threshold A1 and the remaining capacity $SOC_{B1}$ or the remaining capacity $SOC_{B2}$, whichever is smaller, is less than the threshold B (step S5: Yes), the HV-ECU 102 advances the connection-state control processing to step S6. On the other hand, when the difference $|SOC_{B1}-SOC_{B2}|$ is equal to or less than the threshold A1 or the remaining capacity $SOC_{B1}$ or the remaining capacity $SOC_{B2}$, whichever is smaller, is equal to or greater than the threshold B (step S5: No), the HV-ECU 102 advances the connection-state control processing to step S7. Note that, when the difference $|SOC_{B1}-SOC_{B2}|$ is greater than the threshold A1 or the remaining capacity $SOC_{B1}$ or the remaining capacity $SOC_{B2}$, whichever is smaller, is less than the threshold B, the HV-ECU 102 may advance the connection-state control processing to step S6, or advance the connection-state control processing to step S7 otherwise.

In step S6, the HV-ECU 102 determines the connection state of the first battery B1, the second battery B2, and the inverter as the parallel connection state. The processing of step S6 is thereby completed, and the connection-state control processing proceeds to step S7.

In step S7, the HV-ECU 102 determines whether the difference $|SOC_{B1}-SOC_{B2}|$ calculated in step S5 is greater than a threshold A2 (>threshold A1). As the result of the determination, when the difference $|SOC_{B1}-SOC_{B2}|$ is greater than the threshold A2 (step S7: Yes), the HV-ECU 102 advances the connection-state control processing to step S8. On the other hand, when the difference $|SOC_{B1}-SOC_{B2}|$ is less than the threshold A2 (step S7: No), the HV-ECU 102 terminates the series of connection-state control processing. The HV-ECU 102 may change the threshold A2 depending on the required power of the motor, the motor rotation number, and the motor torque.

In step S8, the HV-ECU 102 determines whether the remaining capacity $SOC_{B1}$ is greater than the remaining capacity $SOC_{B2}$. As the result of the determination, when the remaining capacity $SOC_{B1}$ is greater than the remaining capacity $SOC_{B2}$ (step S8: Yes), the HV-ECU 102 advances the connection-state control processing to step S9. On the other hand, when the remaining capacity $SOC_{B1}$ is less than the remaining capacity $SOC_{B2}$ (step S8: No), the HV-ECU 102 advances the connection-state control processing to step S11.

In step S9, the HV-ECU 102 determines whether the required power of the motor is less than a possible output voltage $Wout_{B1}$ of the first battery B1. As the result of the determination, when the required power of the motor is less than the possible output voltage $Wout_{B1}$ of the first battery B1 (step S9: Yes), the HV-ECU 102 advances the connection-state control processing to step S10. On the other hand, when the required power of the motor is greater than the possible output voltage $Wout_{B1}$ of the first battery B1 (step S9: No), the HV-ECU 102 terminates the series of connection-state control processing.

In step S10, the HV-ECU 102 determines the connection state with the inverter as the single connection state of the first battery B1. The processing of step S10 is thereby completed, and the series of connection-state control processing is terminated.

In step S11, the HV-ECU 102 determines whether the required power of the motor is less than a possible output voltage Wout$_{B2}$ of the second battery B2. As the result of the determination, when the required power of the motor is less than the possible output voltage Wout$_{B2}$ of the second battery B2 (step S11: Yes), the HV-ECU 102 advances the connection-state control processing to step S12. On the other hand, when the required power of the motor is greater than the possible output voltage Wout$_{B2}$ of the second battery B2 (step S11: No), the HV-ECU 102 terminates the series of connection-state control processing.

In step S12, the HV-ECU 102 determines the connection state with the inverter as the single connection state of the second battery B2. The processing of step S12 is thereby completed, and the series of connection-state control processing is terminated. Thereafter, the HV-ECU 102 controls the connection state of the first battery B1, the second battery B2, and the inverter based on the results of the processing of steps S2, S4, S6, S10, and S12.

Figure 7:
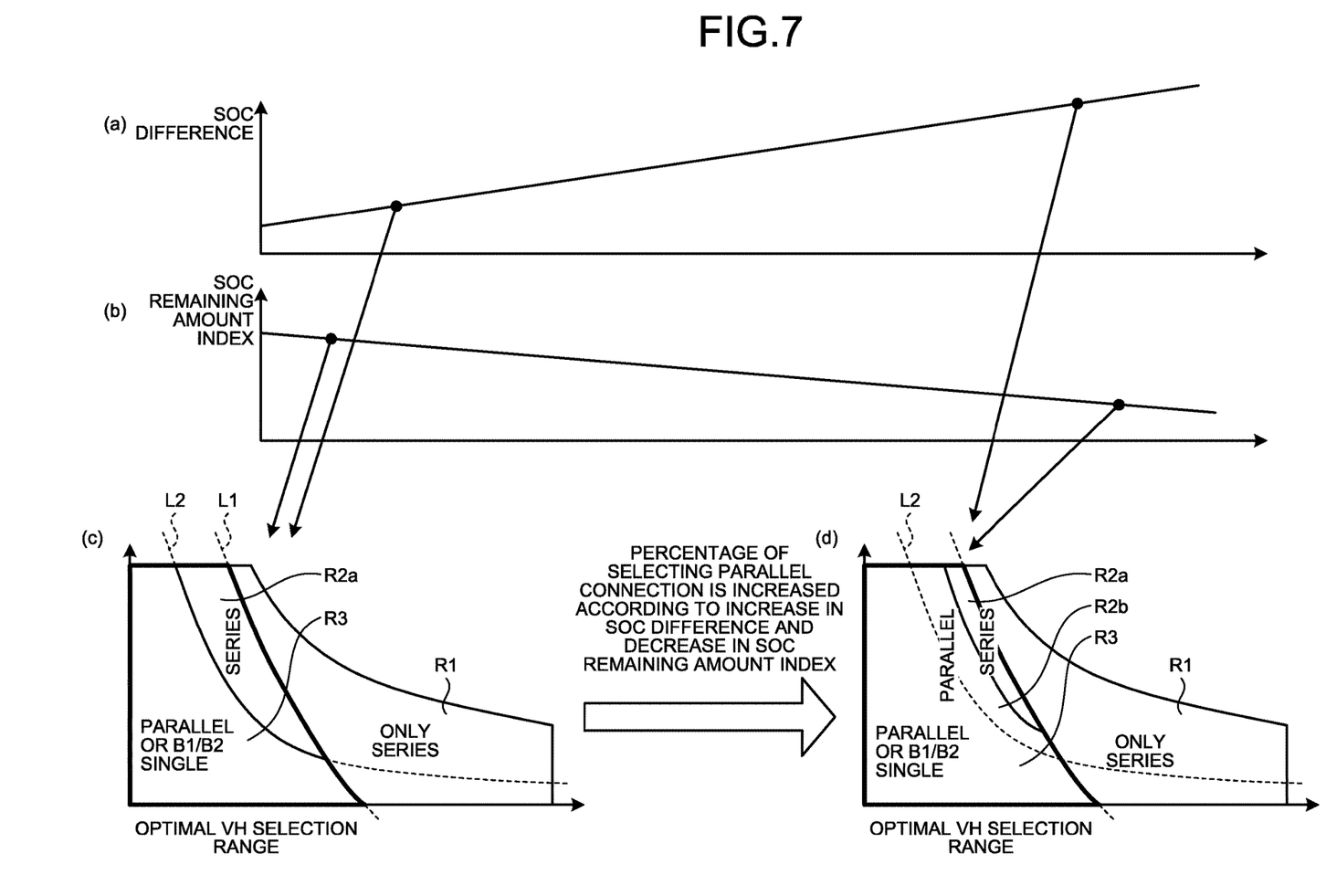
FIG. 7 is a diagram illustrating an effect of connection-state control processing according to an embodiment of the present disclosure.
Figure 8:
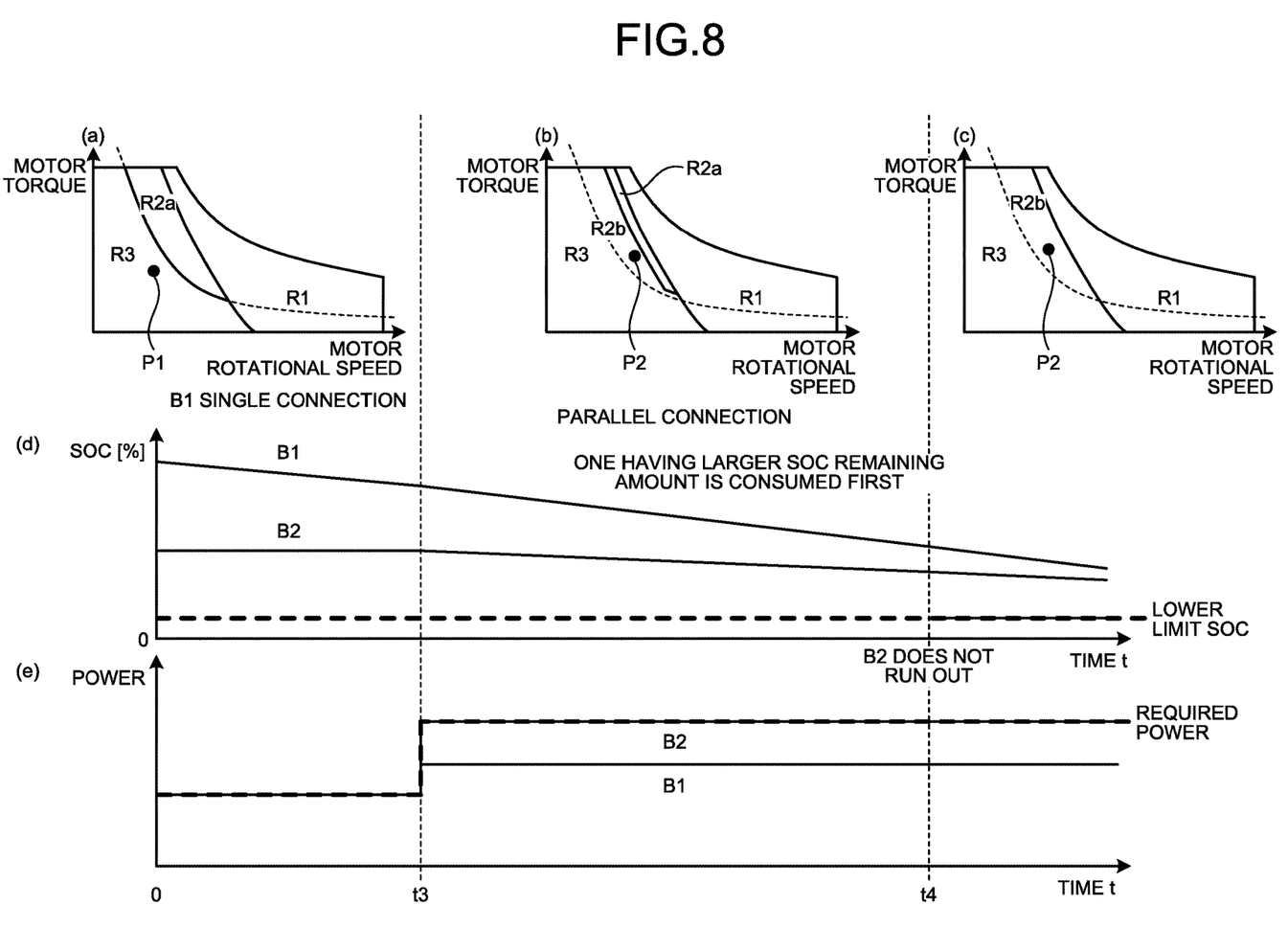
FIG. 8 is a diagram illustrating an effect of connection-state control processing according to an embodiment of the present disclosure.

As apparent from the above description, in the connection-state control processing according to an embodiment of the present disclosure, when the remaining capacity difference (SOC difference) between the first battery B1 and the second battery B2 is large as illustrated in FIG. 7, the HV-ECU 102 reduces a range R2a in which the motor operates in the series connection state and increases ranges R2b and R3 in which the motor operates in the parallel connection state or the single connection state of the battery having the larger remaining capacity, as compared with the case where the remaining capacity difference is small. With this processing, when the requested operating point P1, at which the connection state is the single connection state of the first battery B1 or the single connection state of the second battery B2, is changed to the requested operating point P2 as illustrated in FIG. 8, and when the difference between the remaining capacity of the first battery B1 and the remaining capacity of the second battery B2 is large, the motor is operated in the parallel connection. Thus, since power is consumed from the battery having the larger remaining capacity first, it is possible to prevent the battery having the smaller remaining capacity from reaching the lower limit SOC, and to prevent the required output from being restricted after time t4 (corresponding to time t2 in FIG. 5).

In addition, in the connection-state control processing according to an embodiment of the present disclosure, when the index correlated with the remaining capacities of the first battery B1 and the second battery B2 is low as illustrated in FIG. 7, the HV-ECU 102 reduces the range R2a in which the motor operates in the series connection state and increases the ranges R2b and R3 in which the motor operates in the parallel connection state or the single connection state of the battery having the larger remaining capacity, as compared with the case where the index is high. With this configuration, when the remaining capacity has a room and the output is not immediately restricted, the motor is able to operate in the series connection state as the original setting, and it is possible to prevent the loss from being increased due to the operation in the parallel connection state.

Furthermore, in the connection-state control processing according to an embodiment of the present disclosure, the HV-ECU 102 reduces the range in which the motor operates in the series connection state and increases the range in which the motor operates in the parallel connection state, in an operating range in which the output is large, or reduces the range in which the motor operates in the series connection state and increases the range in which the motor operates in the parallel connection state or the single connection state of the battery having the larger remaining capacity, in an operating range in which the output is small. With this configuration, it is possible to prevent the required output from not being output by operating in the single connection state in the operating range in which the output is large.

Furthermore, in the connection-state control processing according to an embodiment of the present disclosure, in the operating range in which the output is small, the HV-ECU 102 increases the range in which the motor operates in the parallel connection state by the reduced amount of the range in which the motor operates in the series connection state when the remaining capacity difference is equal to or greater than the threshold A1 and equal to or less than the threshold A2, and increases the range in which the motor operates in the single connection state of the battery having the larger remaining capacity when the remaining capacity difference is greater than the threshold A2. With this configuration, it is possible to prevent the loss from being worse than the operation in the single connection state by operating in the parallel connection state as much as possible.

Figure 9:
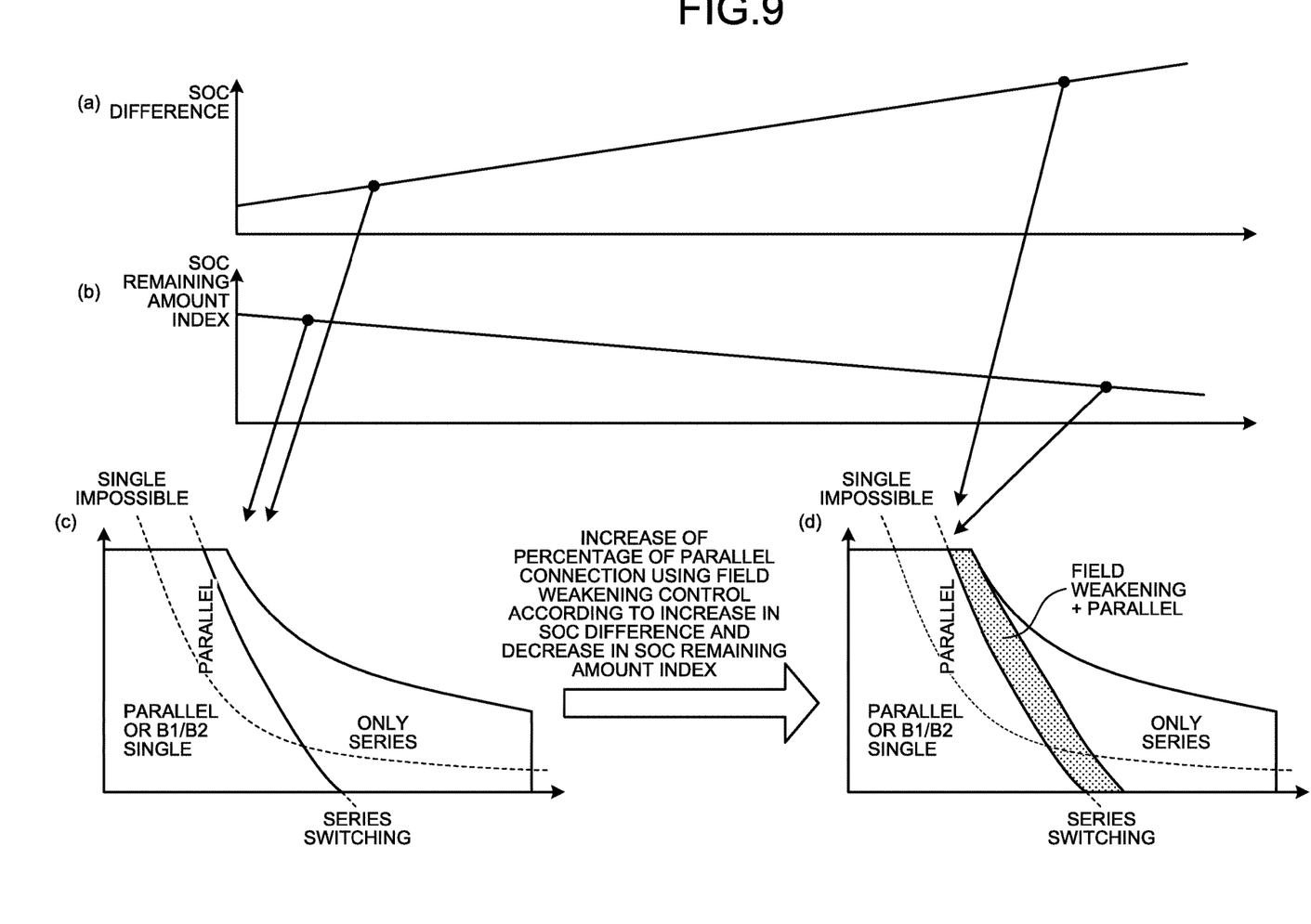
FIG. 9 is a diagram illustrating a modification of connection-state control processing according to an embodiment of the present disclosure.

Note that, since lowering the counter-electromotive voltage of the motor by d-axis current increase control, which is called field weakening control, allows the motor to operate in the parallel connection state even in the range in which the motor has operated in the series connection state, the HV-ECU 102 may increase, when the remaining capacity difference between the first battery B1 and the second battery B2 is large as illustrated in FIG. 9, the percentage of the parallel connection state using the field weakening control, as compared with the case where the remaining capacity difference is small.

In addition, it has been described that the connection-state control processing according to an embodiment of the present disclosure focusing on the increase and decrease of the operating range, but connection-state control processing according to an embodiment of the present disclosure focusing on a specific operation point can be described as follows.

That is, in the connection-state control processing according to an embodiment of the present disclosure, the HV-ECU 102 operates, in order to obtain a certain output, the motor in the series connection state when the remaining capacity difference between the first battery B1 and the second battery B2 is small, or in the parallel connection state or the single connection state of the battery having the larger remaining capacity when the remaining capacity difference is large. With this configuration, it is possible to prevent the remaining capacity of only one of the first battery B1 and the second battery B2 from being reduced, and to prevent the output from being restricted due to the imbalance of the remaining capacities of the first battery B1 and the second battery B2.

Furthermore, in the connection-state control processing according to an embodiment of the present disclosure, the HV-ECU 102 operates the motor in the series connection state in order to obtain a certain output in the operating range R1 in which the output is large, or operates the motor in the series connection state when the remaining capacity difference between the first battery B1 and the second battery B2 is small, or in the parallel connection state or the single connection state of the battery having the larger remaining capacity when the remaining capacity difference is large in order to obtain a certain output in the operating ranges R2a, R2b, and R3 in which the output is smaller than the output in the operating range. However, when the remaining capacity of one battery is very low, the motor is not operated in the series connection state in the operating range R1.

The embodiment to which the disclosure made by the inventors has been applied has been described above, but the present disclosure is not limited by the description and the drawings that are part of the disclosure of the present disclosure based on the embodiment. That is, other embodiments, examples, operation techniques and the like to be made by those skilled in the art based on the present embodiment are all included in the scope of the present disclosure.

With a vehicle control device according to the present disclosure, it is possible to prevent the remaining capacity of only one of two power supplies from being reduced, and to prevent the output from being restricted due to the imbalance of the remaining capacities of the two power supplies.

According to an embodiment, when the remaining capacity has a room and the output is not immediately restricted, the motor is able to operate in the series connection state as the original setting, and it is possible to prevent the loss from being increased due to the operation in the parallel connection state.

According to an embodiment, it is possible to prevent the required output from not being output by operating in the single connection state in the operating range in which the output is large.

According to an embodiment, it is possible to prevent the loss from being worse than the operation in the single connection state by operating in the parallel connection state as much as possible.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle control device comprising:
   a first switch element connected between a positive line and a first node;
   a second switch element connected between the first node and a second node;
   a third switch element connected between the second node and a negative line;
   a first power supply having a positive electrode and a negative electrode, which are connected to the first node and the negative line, respectively;
   a reactor element connected between the positive line and a third node; and
   a second power supply having a positive electrode and a negative electrode, which are connected to the third node and the second node, respectively, wherein
   the vehicle control device is configured to switch, by switching on/off states of the first switch element, the second switch element, and the third switch element, a connection state of the first power supply, the second power supply, and an electrical load between a series connection state, in which the first power supply and the second power supply, which are connected in series, are connected to the electrical load, a parallel connection state, in which the first power supply and the second power supply, which are connected in parallel, are connected to the electrical load, and a single connection state in which only one of the first power supply and the second power supply is connected to the electrical load, and
   the vehicle control device further comprises a control unit configured, when a remaining capacity difference between the first power supply and the second power supply is larger than a predetermined remaining capacity difference value, to reduce a first operating range, in which the connection state with the electrical load is controlled to be the series connection state, and increase a second operating range, in which the connection state with the electrical load is controlled to be the parallel connection state or the single connection state of one of the power supplies having a larger remaining capacity, as compared with a case where the remaining capacity difference is smaller than the predetermined remaining capacity difference value.

2. The vehicle control device according to claim 1, wherein, when an index correlated with the remaining capacities of the first power supply and the second power supply is low, the control unit is configured to reduce the first operating range and increase the second operating range, as compared with the case where the index is high.

3. The vehicle control device according to claim 1, wherein the control unit is configured to reduce the first operating range and increase an operating range, in which the connection state with the electrical load is controlled to be the series connection state, in an operating range, in which an output is larger than a predetermined output value, and reduce the first operating range and increase the second operating range in an operating range, in which an output is smaller than the predetermined output value.

4. The vehicle control device according to claim 3, wherein, in the operating range in which the output is smaller than the predetermined output value, the control unit is configured to increase an operating range, in which the connection state with the electrical load is controlled to be the parallel connection state, by an amount that the first operating range is reduced when the remaining capacity difference is equal to or greater than a first predetermined value and equal to or less than a second predetermined value, which is equal to or greater than the first predetermined value, and increase the operating range, in which the connection state with the electrical load is controlled to be the single connection state of one of the power supplies having the larger remaining capacity, when the remaining capacity difference is greater than the second predetermined value.

5. A vehicle control device comprising:
   a first switch element connected between a positive line and a first node;
   a second switch element connected between the first node and a second node;
   a third switch element connected between the second node and a negative line;
   a first power supply having a positive electrode and a negative electrode, which are connected to the first node and the negative line, respectively;
   a reactor element connected between the positive line and a third node; and
   a second power supply having a positive electrode and a negative electrode, which are connected to the third node and the second node, respectively, wherein
   the vehicle control device is configured to switch, by switching on/off states of the first switch element, the second switch element, and the third switch element, a connection state of the first power supply, the second power supply, and an electrical load between a series connection state, in which the first power supply and the second power supply, which are connected in series, are connected to the electrical load, a parallel connection state, in which the first power supply and the second power supply, which are connected in parallel, are connected to the electrical load, and a single connection state in which only one of the first power supply and the second power supply is connected to the electrical load, and the vehicle control device further comprises a control unit configured, in order to obtain a certain output, to control the connection state with the electrical load to be the series connection state when a remaining capacity difference between the first power supply and the second power supply is smaller than a predetermined remaining capacity difference value, and control the connection state with the electrical load to be the parallel connection state or the single connection state of one of the power supplies having the larger remaining capacity when the remaining capacity difference between the first power supply and the second power supply is larger than the predetermined remaining capacity difference value.

6. The vehicle control device according to claim 5, wherein the control unit controls the connection state with the electrical load to be the series connection state in order to obtain a certain output in a first operating range, in which an output is larger than a predetermined output value, and control the connection state with the electrical load to be the series connection state when the remaining capacity difference between the first power supply and the second power supply is smaller than the predetermined remaining capacity difference value, and control the connection state with the electrical load to be the parallel connection state or the single connection state of one of the power supplies having the larger remaining capacity when the remaining capacity difference between the first power supply and the second power supply is larger than the predetermined remaining capacity difference value in order to obtain a certain output in a second operating range, in which an output is smaller than the output in the first operating range.

* * * * *